(12) United States Patent
Iseno et al.

(10) Patent No.: US 12,041,329 B2
(45) Date of Patent: Jul. 16, 2024

(54) ELECTRONIC APPARATUS COMPRISING FIRST POWER SUPPLY CHARGING CONNECTED SECOND POWER SUPPLY

(71) Applicant: CANON KABUSHIKI KAISHA, Tokyo (JP)

(72) Inventors: Toshiya Iseno, Tokyo (JP); Hironori Fukuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 17/204,446

(22) Filed: Mar. 17, 2021

(65) Prior Publication Data

US 2021/0297569 A1 Sep. 23, 2021

(30) Foreign Application Priority Data

Mar. 18, 2020 (JP) ................................. 2020-048277

(51) Int. Cl.
*H04N 23/52* (2023.01)
*G02B 7/10* (2021.01)
(Continued)

(52) U.S. Cl.
CPC ......... *H04N 23/52* (2023.01); *G02B 27/0006* (2013.01); *G03B 17/02* (2013.01); *G03B 17/56* (2013.01); *G03B 17/561* (2013.01); *H02J 7/00* (2013.01); *H04N 23/51* (2023.01); *H04N 23/54* (2023.01); *H04N 23/55* (2023.01); *H04N 23/65* (2023.01); *H04N 23/651* (2023.01); *H04N 23/6812* (2023.01); *H04N 23/687* (2023.01);
(Continued)

(58) Field of Classification Search
CPC ........ H04N 23/51; H04N 23/52; H04N 23/54; H04N 23/55; H04N 23/65; H04N 23/651; H04N 23/6812; H04N 23/687; H04N 23/811; H04N 25/709; G03B 7/26; G03B 17/02; G03B 17/56; G03B 17/561; G03B 2205/0038; G03B 2205/0061; G03B 2217/007; G02B 27/0006; G02B 7/102; H02J 7/00–36; H01M 10/0525; H01M 10/0562; H01M 10/44; H01M 10/441; H01M 2220/30
See application file for complete search history.

(56) References Cited

U.S. PATENT DOCUMENTS

2010/0060747 A1* 3/2010 Woodman ............ H04N 23/663
348/222.1
2011/0242340 A1* 10/2011 Miyawaki ............ H04N 23/687
348/E5.045
(Continued)

FOREIGN PATENT DOCUMENTS

JP 2002-123337 A 4/2002

*Primary Examiner* — Twyler L Haskins
*Assistant Examiner* — Akshay Trehan
(74) *Attorney, Agent, or Firm* — Cowan, Liebowitz & Latman, P.C.

(57) ABSTRACT

An electronic apparatus includes a first power supply attachable to and detachable from a body of the electronic apparatus, a driver configured to perform a predetermined operation, a substrate connected to the driver, and a second power supply mounted on the substrate, and electrically connected to and charged by the first power supply. The driver is drivable by a power supplied from the first power supply and drivable by a power supplied from the second power supply.

10 Claims, 12 Drawing Sheets

(51) Int. Cl.
*G02B 27/00* (2006.01)
*G03B 17/02* (2021.01)
*G03B 17/56* (2021.01)
*H01M 10/052* (2010.01)
*H02J 7/00* (2006.01)
*H04N 23/51* (2023.01)
*H04N 23/54* (2023.01)
*H04N 23/55* (2023.01)
*H04N 23/65* (2023.01)
*H04N 23/68* (2023.01)
*H04N 23/81* (2023.01)

(52) U.S. Cl.
CPC .......... *H04N 23/811* (2023.01); *G02B 7/102* (2013.01); *G03B 2205/0038* (2013.01); *G03B 2205/0061* (2013.01); *G03B 2217/007* (2013.01); *H01M 10/052* (2013.01)

(56) References Cited

U.S. PATENT DOCUMENTS

| | | | | |
|---|---|---|---|---|
| 2015/0195442 A1* | 7/2015 | Pacurariu | ............... | H04N 23/66 348/211.2 |
| 2018/0107099 A1* | 4/2018 | Yasuda | .................. | G03B 17/55 |
| 2020/0266627 A1* | 8/2020 | Ha | ........................ | H02J 7/0016 |
| 2022/0158466 A1* | 5/2022 | Choi | ........................... | B25J 9/16 |

* cited by examiner

ELECTRONIC APPARATUS COMPRISING FIRST POWER SUPPLY CHARGING CONNECTED SECOND POWER SUPPLY

BACKGROUND OF THE INVENTION

Field of the Invention

The present invention relates to an electronic apparatus, and more particularly to a structure having a mount type battery.

Description of the Related Art

In addition to the imaging function, conventional digital cameras are provided with various functions, such as a dust removing function of a low-pass filter in front of an image sensor, an image stabilizing function for driving the image sensor, and a function of wirelessly transmitting a captured image to another electronic apparatus. Digital cameras realize these functions by receiving the power from a replaceable battery.

However, in the structure where the power is supplied from a replaceable battery, some functions may not be completed or inconvenience may occur depending upon states of the replaceable battery. More specifically, the dust removal performed when the power supply is turned off may not be completed due to the interrupted power supply when the user removes the replaceable battery from the body without an operation of turning off the power supply. Further, in an image pickup apparatus including an imaging unit driving mechanism, the image sensor is freely movable according to orientations of the image pickup apparatus when the power supply is turned off. At this time, if the surface of the image sensor is cleaned with a cleaning tool, the image sensor may move together with the cleaning tool, and poor cleaning may occur. Therefore, it is demanded to realize a structure configured to complete the above functions without causing any inconvenience for the user operation regardless of the attachment state and the remaining amount of the replaceable battery.

Japanese Patent Laid-Open No. ("JP") 2002-123337 discloses an information processing apparatus that can be driven by an easily available dry cell even when a secondary battery is exhausted in order to improve usability.

However, the information processing apparatus disclosed in JP 2002-123337 requires a connector for connecting the secondary battery to the body of the electronic apparatus and a charging circuit chargeable from the AC power supply, causing the electronic apparatus to be large and complicated.

SUMMARY OF THE INVENTION

The present invention provides an electronic apparatus that can perform various functions regardless of a state of a replaceable battery with a simple structure.

An electronic apparatus according to one aspect of the present invention includes a first power supply attachable to and detachable from a body of the electronic apparatus, a driver configured to perform a predetermined operation, a substrate connected to the driver, and a second power supply mounted on the substrate, and electrically connected to and charged by the first power supply. The driver is drivable by a power supplied from the first power supply and drivable by a power supplied from the second power supply.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. Corresponding elements in respective figures will be designated by the same reference numerals, and a duplicate description thereof will be omitted.

Figure 1A:
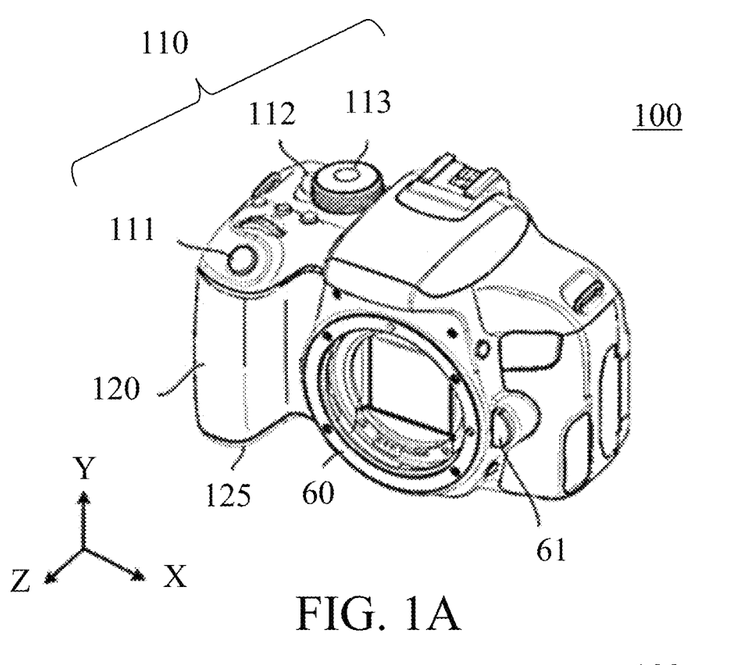
FIGS. 1A and 1B are external perspective views of a lens interchangeable type digital camera which is an example of an electronic apparatus according to one embodiment of the present invention.
Figure 1B:
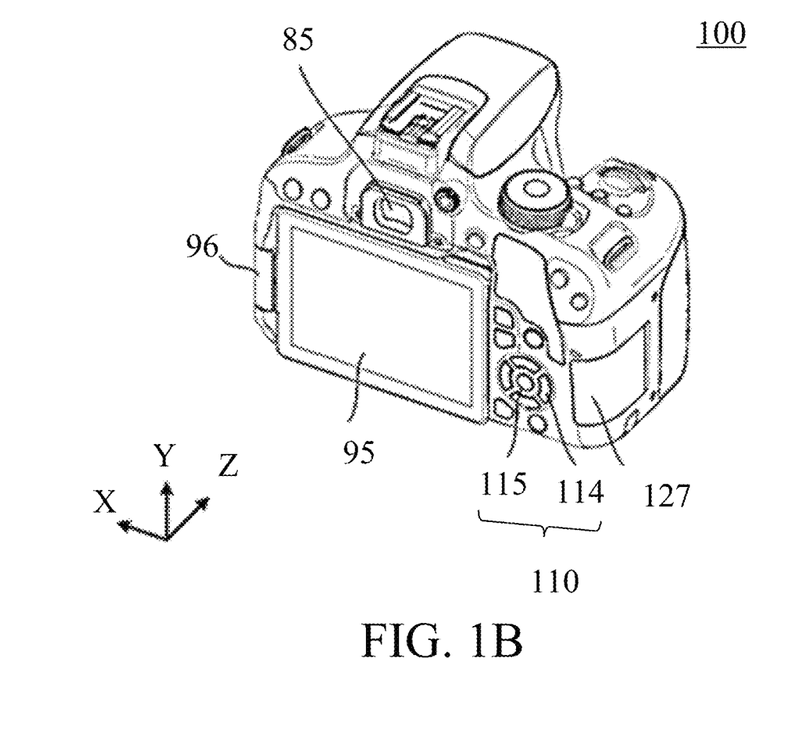
Figure 2:
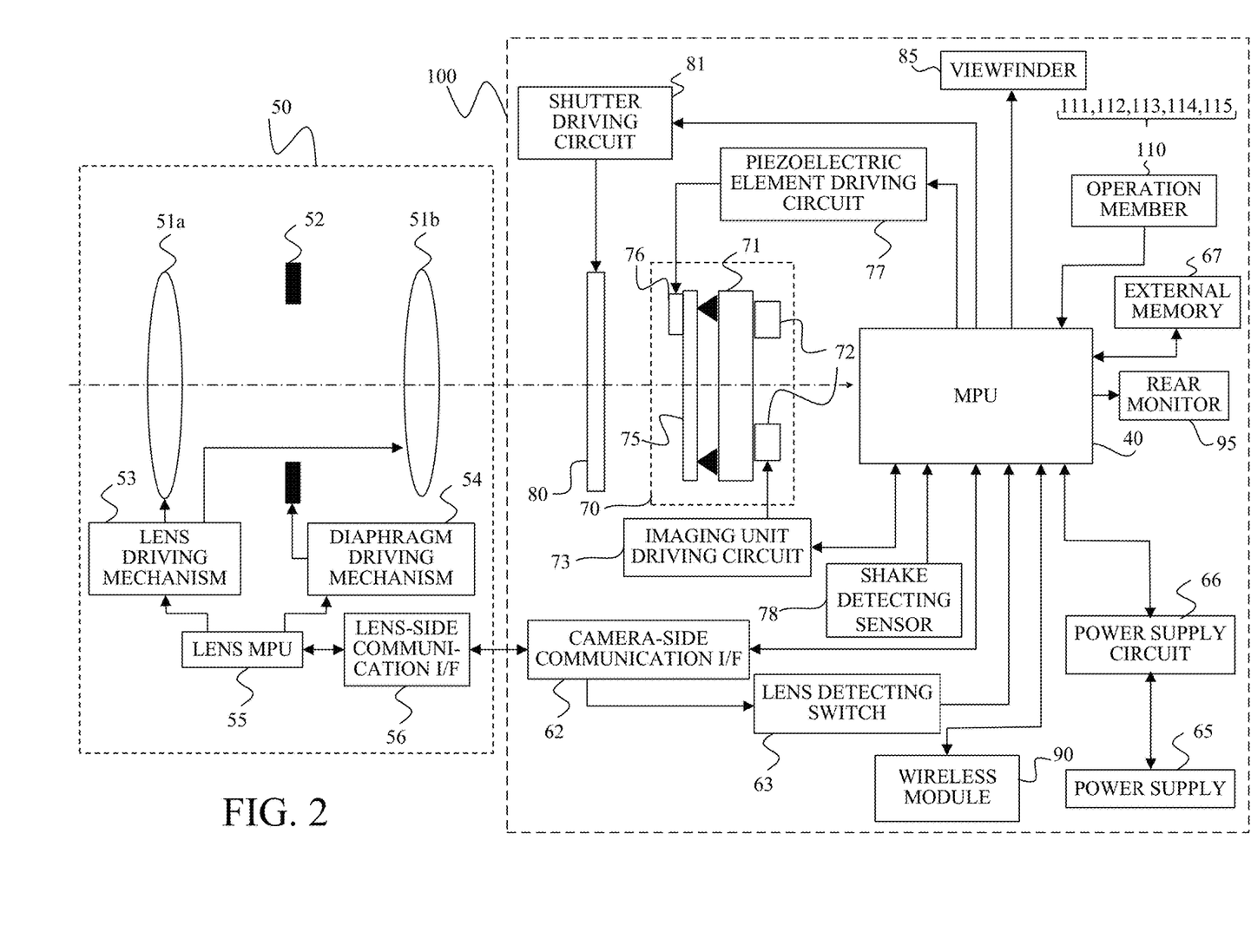
FIG. 2 is a block diagram of the camera.

FIGS. 1A and 1B are external perspective views of an interchangeable lens digital camera (referred to as a camera hereinafter) 100, which is an example of an electronic apparatus according to one embodiment of the present invention. FIG. 1A illustrates the camera 100 viewed from the front side. FIG. 1B illustrates the camera 100 viewed from the rear side. FIG. 2 is a block diagram of the camera 100.

Provided on top and rear surfaces of the camera 100 is an operation member 110 including a plurality of buttons, dials, and the like for the user to set the camera 100 and perform an imaging operation. This embodiment arranges, as the operation members 110, a shutter button 111 for performing the imaging operation, a power switch 112 for switching the power on and off, and a mode dial 113 for switching an imaging mode on the top surface of the camera 100. Further, a selection button 114 for selecting various settings and a setting button 115 for determining various settings are arranged as the operation members 110 on the rear surface of the camera 100.

A grip 120 has a curved shape protruding to the front side of one end (first end) of the camera 100 so that the user can hook the fingers (mainly the middle finger, third finger, and little finger) to grip the camera 100. A battery lid 125 is provided on the bottom surface side of the grip 120, and has a first end pivotally supported by the camera 100 and a second end rotatable between a closed state locked to the camera 100 and an open state separated from the camera 100. A media lid 127 is openable and closable between an open state for exposing a chamber of an external memory 67 and a closed state for shielding the chamber of the external memory 67.

An imaging lens 50 is attachable to and detachable from a mount opening 60 on a front surface of the camera 100 by pressing a lens detachment button 61. The camera 100 and the imaging lens 50 are electrically connected by a camera-side communication IF 62 and a lens-side communication I/F 56, and can communicate various signals. The power is also supplied from the camera 100 to the imaging lens 50. A lens detecting switch 63 determines whether or not the camera 100 and the imaging lens 50 are ready to communicate with each other via the camera-side communication I/F 62 and the lens-side communication I/F 56. The lens detecting switch 63 can identify the type of the imaging lens 50 mounted on the camera 100. Lenses 51*a* and 51*b* include a plurality of lenses such as a focus lens and a zoom lens. A diaphragm (aperture stop) 52 adjusts an opening amount. A lens driving mechanism 53 drives the lenses 51*a* and 51*b* for focusing and zooming. A diaphragm driving mechanism 54 drives the diaphragm 52 and controls an aperture value (F-number). A lens CPU 55 processes a signal of the imaging lens 50.

A camera MPU (driver, first controller) 40 has a function of a CPU that controls the operation of each component in the camera 100. The camera MPU 40 will be simply referred to as the MPU 40 hereinafter. The MPU 40 receives the input signal from the operation member 110, and controls the camera operation based on the input signal. In this embodiment, when the power switch 112 is turned off by the user, the MPU 40 makes a control so as to turn off the power after storing the camera settings such as the ISO speed and the shutter speed just before the power is turned off. Thereby, when the camera 100 is powered on next time, the camera setting just before the power is turned off can be continuously used. In other words, the user can more conveniently use the camera 100 without inputting the setting again.

The external memory 67 is a semiconductor memory card or the like attachable to and detachable from the camera 100, and can record captured images. The MPU 40 transmits image data in order to record the image in the external memory 67.

A battery (first power supply) 65 is a secondary battery including a battery pack that is attachable to and detachable from the camera 100 (body of the electronic apparatus), and supplies the power to each component in the camera 100. A power supply circuit 66 converts the voltage of the battery 65 into the voltage required for the operation of each component in the camera 100.

An image sensor 71 includes a CMOS sensor or a CCD sensor that captures a light flux taken from the imaging lens 50 and photoelectrically converts the object image, and thus has an electronic shutter function.

A shutter 80 includes a focal plane shutter, and provides an incidence control of the imaging light flux by exposing and shielding the image sensor 71. A shutter driving circuit 81 moves a shutter curtain (not shown) of the shutter 80 between an open state for exposing the image sensor 71 and a closed state for shielding the image sensor 71.

An optical low-pass filter (optical element) 75 is a rectangular element made of a material such as quartz, and is disposed in front of the image sensor 71. A piezoelectric element 76 is adhered to and held on the surface of the optical low-pass filter 75, and when the voltage is applied, the optical low-pass filter 75 is vibrated in a wavy shape in the Z-axis direction (the optical axis direction of the camera 100). A piezoelectric element driving circuit 77 controls an energization of the piezoelectric element 76. The piezoelectric element 76 and the piezoelectric element drive circuit 77 are electrically connected via a piezoelectric element flexible printed circuits (board) (FPC) 180, which will be described later. By controlling the electrification of the piezoelectric element 76 via the piezoelectric element driving circuit 77, the optical low-pass filter 75 can be vibrated in a wavy shape in the Z-axis direction in a plurality of vibration modes having different orders. Thereby, dust adhering to the surface of the optical low-pass filter 75 can be removed. A constituent unit including the optical low-pass filter 75, the piezoelectric element 76, and the piezoelectric element FPC 180 will be referred to as a dust removing unit (driver) 79. In this embodiment, the dust removal is performed at the time of starting the camera, at the end of the camera operation, or at an arbitrary timing operated by the user.

A shake detecting sensor 78 detects a shake amount of the camera 100 due to camera shake or the like. More specifically, the shake detecting sensor 78 includes an angular velocity sensor, periodically detects an angular velocity representing a moving amount of the camera 100, converts it into an electric signal, and outputs the resultant signal. The imaging unit driving mechanism (driver) 72 includes a driving coil, a permanent magnet, and a position detecting sensor, and drives the image sensor 71 in a plane orthogonal to the optical axis of the camera 100. An imaging unit driving mechanism control IC (second controller) 308 is electrically connected to the imaging unit driving mechanism 72 via an imaging unit driving mechanism FPC 305 described later, and controls the energization of the imaging unit driving mechanism 72. A constituent unit including the image sensor 71, the imaging unit driving mechanism 72, the optical low-pass filter 75, and the piezoelectric element 76 will be referred to as an imaging unit 70. The image stabilization can be made by driving the imaging unit 70 in a direction that cancels the shake of the camera 100 according to the output of the shake detecting sensor 78.

A viewfinder 85 is provided on upper part of the rear surface of the camera 100, and includes an electronic viewfinder (EVF) that displays a through-image captured by the image sensor 71 and settings of the camera 100. A rear monitor 95 is provided on the rear surface of the camera 100, and includes a liquid crystal display that displays the through-image captured by the image sensor 71, the settings of the camera 100, and a captured image. The rear monitor 95 has a touch panel function. A vari-angle hinge 96 includes a biaxial hinge that rotatably holds the rear monitor 95 on the Y-axis and the X-axis relative to the camera 100. A wireless module (driver) 90 performs a wireless communication with an external device (not shown). In this embodiment, the wireless module 90 has GPS, Wi-Fi, and Bluetooth® functions. In addition, the wireless module 90 has a so-called GPS logger function that receives GPS information at predetermined time intervals and keeps a record of the received GPS information.

Figure 3:
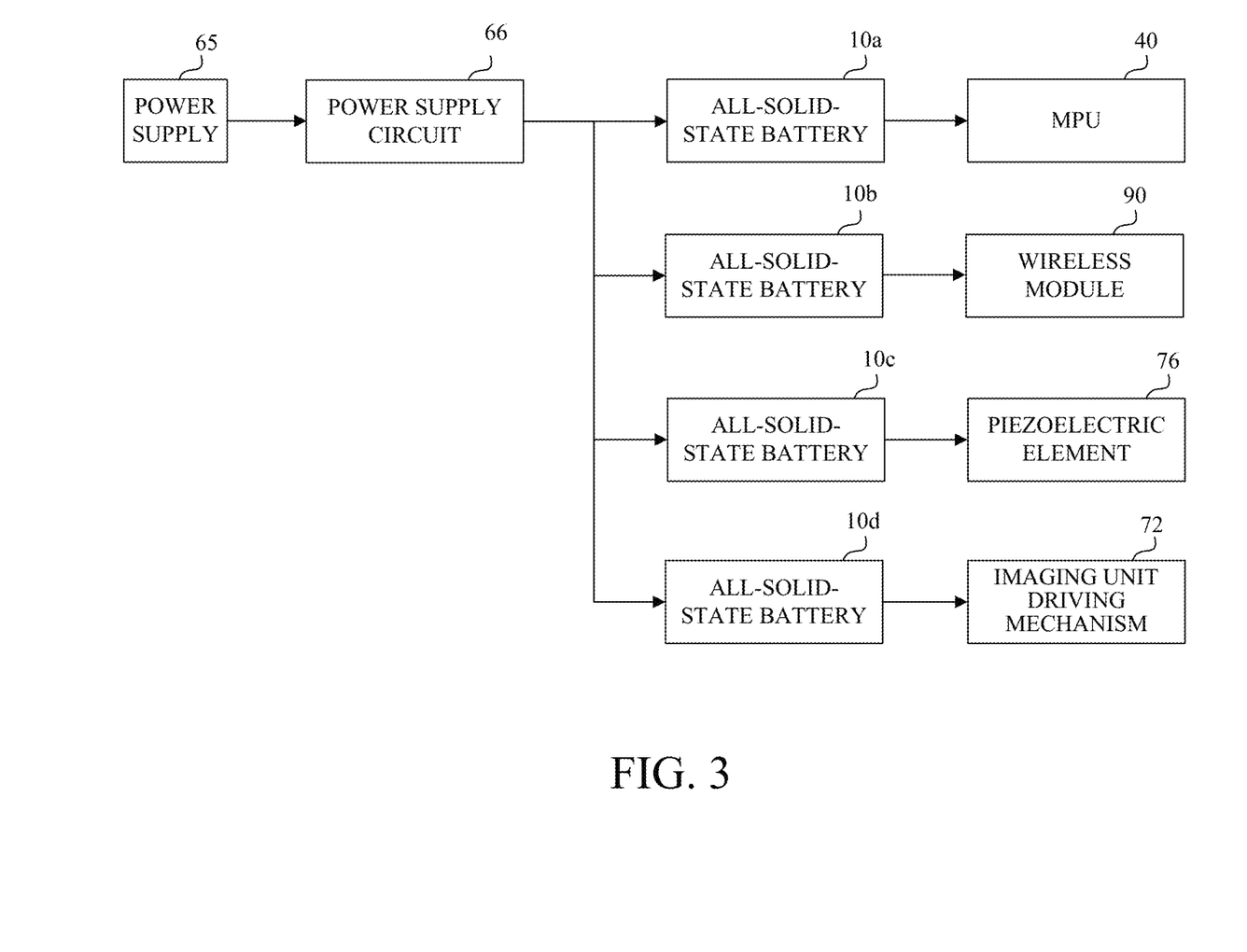
FIG. 3 illustrates a power supply configuration of the camera.

Referring now to FIG. 3, a description will be given of the power supply configuration of the camera 100. FIG. 3 illustrates a power supply configuration of the camera 100. First to fourth all-solid-state batteries (second power supplies) 10*a*, 10*b*, 10*c*, and 10*d* are mount type batteries that can be reflow-mounted on a substrate or a FPC.

The first all-solid-state battery 10*a* is connected to the power supply circuit 66 via a pattern of a control substrate 150, which will be described later, is charged by the power supplied from the power supply circuit 66, and supplies the power to the MPU 40. The first all-solid-state battery 10*a* has a capacity in which the MPU 40 can store at least power for memorizing camera settings such as the ISO speed and the shutter speed just before the power is turned off. That is, the MPU 40 can operate with the power of the battery 65 and the power of the first all-solid-state battery 10*a*. Therefore, even when the battery 65 is removed from the camera 100 or the camera 100 is not powered on, part of the MPU 40 can be operated.

According to the conventional configuration, when the battery 65 is removed from the camera 100 without the power OFF operation using the power switch 112, the power supplied from the power supply circuit 66 is interrupted and the camera settings at the end of the camera operation may not be stored. On the other hand, according to the configuration of this embodiment, even if the power supplied from the power supply circuit 66 is interrupted, the power can be supplied from the first all-solid-state battery 10*a* and thus the camera settings can be stored.

The second all-solid-state battery 10*b* is connected to the power supply circuit 66 via the pattern of the control substrate 150, is charged by the power supplied from the power supply circuit 66, and supplies the power to the wireless module 90. The second all-solid-state battery 10*b* has a capacity for storing the power that can drive the wireless module 90. That is, the wireless module 90 can operate with the power of the battery 65 and the power of the second all-solid-state battery 10*b*. Therefore, the wireless module 90 can be operated even when the battery 65 is removed from the camera 100 or the camera 100 is not powered on.

According to the conventional configuration, if the battery 65 is removed from the camera 100 during the wireless communication, the power supplied from the power supply circuit 66 is interrupted and the wireless communication may not be completed. On the other hand, according to the configuration of this embodiment, even if the power supplied from the power supply circuit 66 is interrupted, the power can be supplied from the second all-solid-state battery 10*b* and the wireless communication can be completed.

The third all-solid-state battery 10*c* is connected to the power supply circuit 66 via the control substrate 150 and a pattern of the piezoelectric element FPC 180, is charged by the power supplied from the power supply circuit 66, and supplies the power to the piezoelectric element 76. The third all-solid-state battery 10*c* has a capacity for storing the power that vibrates the piezoelectric element 76. That is, the piezoelectric element 76 can operate with the power of the battery 65 and the power of the third all-solid-state battery 10*c*. Therefore, the dust removing unit 79 can be operated even when the battery 65 is removed from the camera 100 or the camera 100 is not powered on.

According to the conventional configuration, if the battery 65 is removed from the camera 100 without the power off operation using the power switch 112, the power supplied from the power supply circuit 66 is interrupted and the dust removal at the end of the camera operation may not be completed. On the other hand, according to the configuration of this embodiment, even if the power supplied from the power supply circuit 66 is interrupted, the power can be supplied by the third all-solid-state battery 10*c* and the dust removal at the end of the camera operation can be completed.

The fourth all-solid-state battery 10*d* is connected to the imaging unit driving mechanism 72 via a pattern of the control substrate 150 and the imaging unit driving mechanism FPC 305. Therefore, the fourth all-solid-state battery 10*d* is charged by the power supplied from the power supply circuit 66, and supplies the power to the imaging unit driving mechanism 72. The fourth all-solid-state battery 10*d* has a capacity for storing the power that can drive the imaging unit driving mechanism 72. That is, the imaging unit driving mechanism 72 can operate with the power of the battery 65 and the power of the fourth all-solid-state battery 10*d*. Therefore, the imaging unit driving mechanism 72 can be driven even when the battery 65 is removed from the camera 100 or the camera 100 is not powered on.

According to the conventional configuration, when the battery 65 is removed, the imaging unit 70 freely moves in a plane orthogonal to the optical axis direction, and it is thus difficult to clean the surface of the image sensor 71. However, according to the configuration of this embodiment, the image sensor 70 can be fixed even when the battery 65 is removed, and thus the surface of the image sensor 71 can be easily cleaned.

Figure 4A:
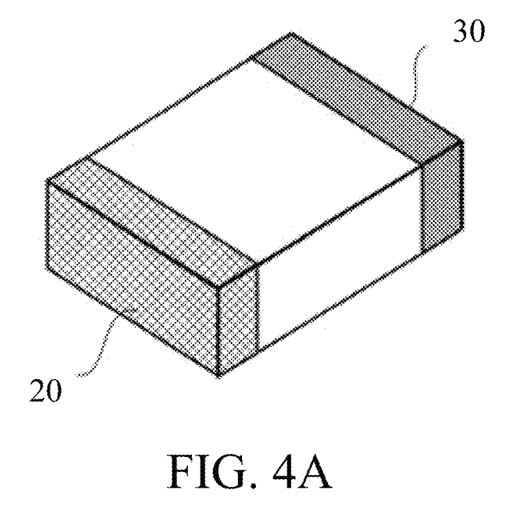
FIGS. 4A and 4B illustrate a structure of an all-solid-state battery.
Figure 4B:
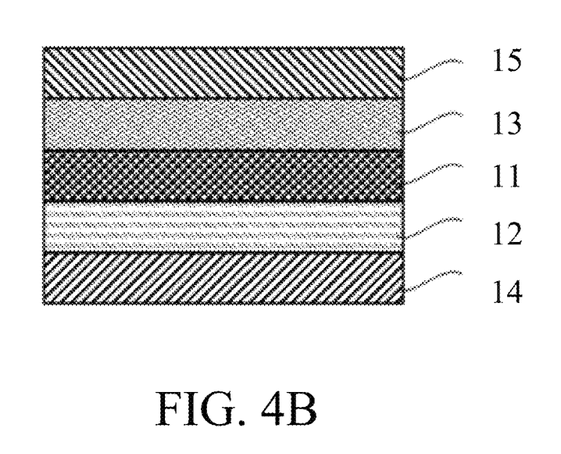

Referring now to FIGS. 4A and 4B, a description will be given of the all-solid-state batteries in this embodiment. FIGS. 4A and 4B illustrate the configuration of the all-solid-state batteries. FIG. 4A illustrates the appearance of an all-solid-state battery. The all-solid-state battery is a secondary battery containing a solid electrolyte, and has a positive electrode terminal 20 and a negative electrode terminal 30 provided at both ends. The positive electrode terminal 20 and the negative electrode terminal 30 are formed of metal plating such as copper (Cu), nickel (Ni), and tin (Sn), and can be soldered by a reflow method or the like. In this embodiment, the all-solid-state battery has a substantially rectangular parallelepiped outer shape having a side of several mm to several tens of mm, and the exterior material is made of ceramics or resin.

FIG. 4B illustrates the internal configuration of the all-solid-state battery. A solid electrolyte layer 11, a positive electroactive substance layer 12, a negative electroactive substance layer 13, a positive electrode current collector layer 14, and a negative electrode current collector layer 15 are laminated in the all-solid-state battery. The method of laminating each layer is not particularly limited, and for example, the material constituting each layer may be made into fine particles and laminated by a method such as coating or printing, such as a bulk type all-solid-state battery, or thin films constituting each layer may be formed and laminated by a vapor phase method or the like a thin film type all-solid-state battery.

The solid electrolyte layer 11 is formed of a solid electrolyte made of a lithium ion conductor such as oxide glass or oxide glass ceramics. The positive electroactive substance layer 12 is formed of a positive electrode active material composed of a lithium compound and a solid electrolyte composed of a lithium ion conductor. The negative electroactive substance layer 13 is formed of a negative electrode active material composed of a carbon material such as graphite and a solid electrolyte made of a lithium ion conductor. The positive electrode current collector layer 14 is formed of a current collector made of a metal such as aluminum (Al), copper (Cu), and nickel (Ni), or an alloy containing these metals. The negative electrode current collector layer 15 is formed of a current collector made of a metal such as aluminum (Al), copper (Cu), nickel (Ni), or an alloy containing these metals.

The all-solid-state battery in this embodiment may be a secondary battery having the positive electrode terminal 20 and the negative electrode terminal 30 that can be soldered at both ends, and contains the solid electrolyte layer 11, the positive electroactive substance layer 12, and the negative electroactive substance layer 13 inside of it. Therefore, another structure and another material may be used, and can be produced with various known techniques.

Figure 5:
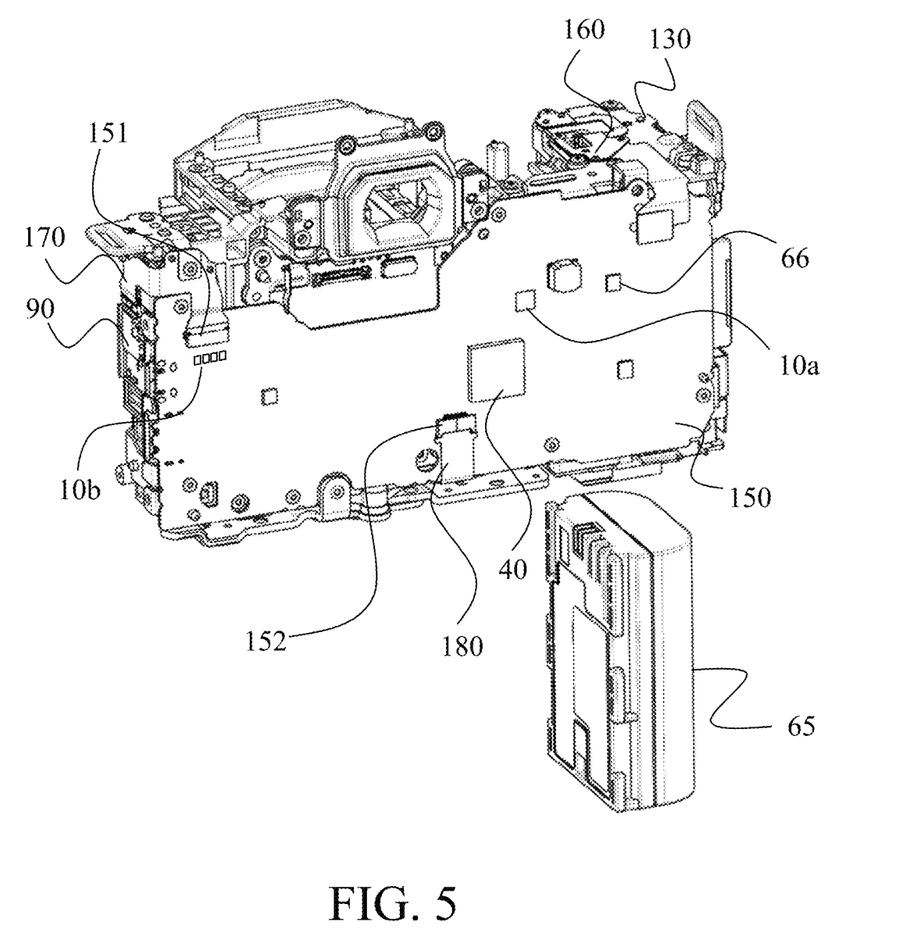
FIG. 5 is a perspective view of the internal structure of the camera.

Referring now to FIG. 5, a description will be given of the internal configuration of the camera 100. FIG. 5 is a perspective view of the internal structure of the camera 100 viewed from the rear side.

A body 130 is a skeleton to which each component of the camera 100 is attached, which is manufactured by injection molding of resin or the like. The body 130 is formed in a shape for housing the battery 65 that is attachable to and detachable from the camera 100. A power supply FPC 160 has a connector with the battery 65, is attached to the body 130, and is connected to the control substrate 150. A circuit is formed by copper foil or the like on the surface of a base material made of an insulating material such as polyimide of the power supply FPC 160, and the outermost surface is laminated by a coverlay made of polyimide or the like. The power supply FPC 160 is flexible, and disposed with a bent shape along the shape of the electronic apparatus, or repeatedly bent. The power supplied from the battery 65 to the control substrate 150 via the power supply FPC 160 is converted into the voltage required for the operation of each unit in the camera 100 by the power supply circuit 66, and is supplied to each unit in the camera 100.

The control substrate 150 is attached to the rear side of the body 130, and mounted with various electronic components constituting an electric circuit for controlling the operation of the camera 100 such as the MPU 40 and the power supply circuit 66 by reflow mounting or the like. The piezoelectric element FPC 180 is compressively attached to the piezoelectric element 76 and connected to the connector 152 of the control substrate 150.

Figure 6:
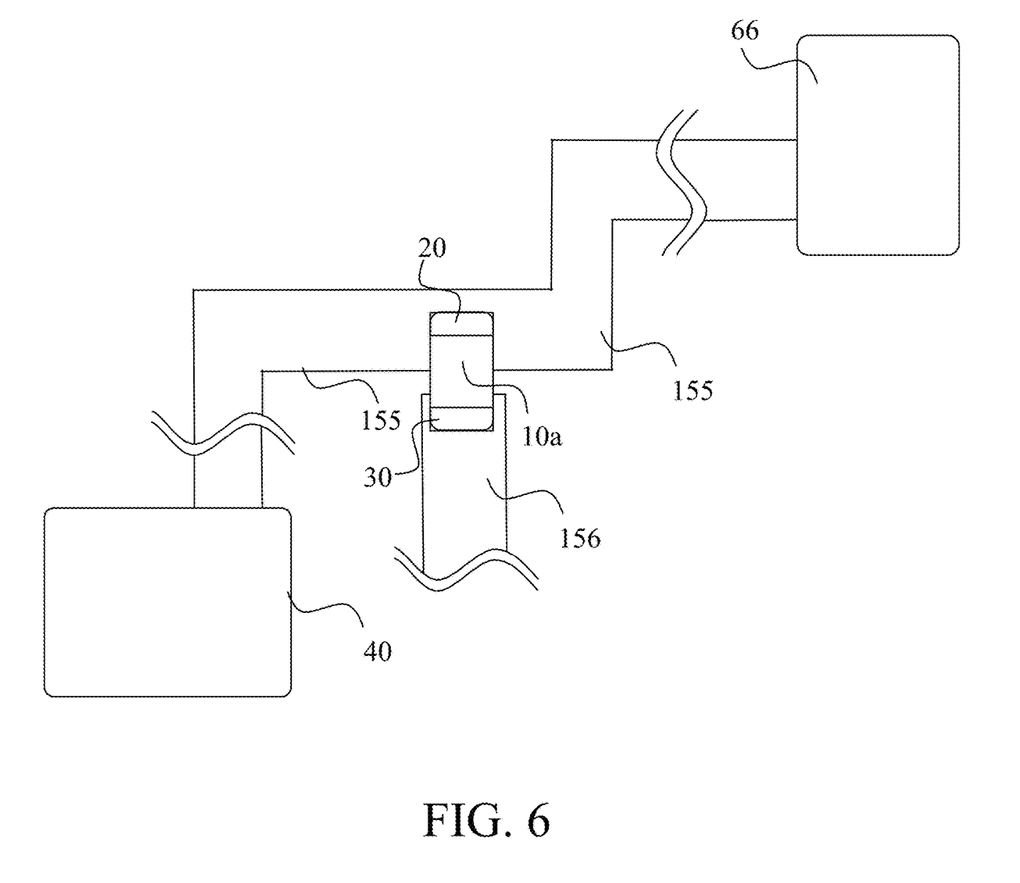
FIG. 6 illustrates a connection of a first all-solid-state battery.

The first all-solid-state battery 10a is disposed between the power supply circuit 66 and the MPU 40, as illustrated in FIG. 6. A power supply pattern 155 and a GND (ground) pattern 156 are made of a conductive material such as copper foil and are wired to the control substrate 150. The power supply pattern 155 is connected to the positive electrode terminal 20, the power supply circuit 66, and the MPU 40 of the first all-solid-state battery 10a. The GND pattern 156 is connected to the negative electrode terminal 30. The first all-solid-state battery 10a is charged by the power supplied from the power supply circuit 66, and can supply the power from the first all-solid-state battery 10a to the MPU 40.

The wireless module 90 is attached to the side surface of the body 130. An electric circuit having a wireless function and an antenna pattern are formed on a substrate formed of the printed wiring board of the wireless module 90. The wireless module 90 is attached to the end (second end) of the camera 100 opposite to the grip 120. Thereby, a good wireless performance can be obtained because the wireless module 90 is not shielded when the user grips the grip 120 to carry the camera 100 or take a photo.

A wireless FPC 170 is electrically connected to the wireless module 90 and the control substrate 150. The wireless module 90 is equipped with an unillustrated connector for fixing and holding the first end of the wireless FPC 170. A control substrate connector 151 for fixing and holding the second end of the wireless FPC 170 is mounted on the control substrate 150.

Figure 7:
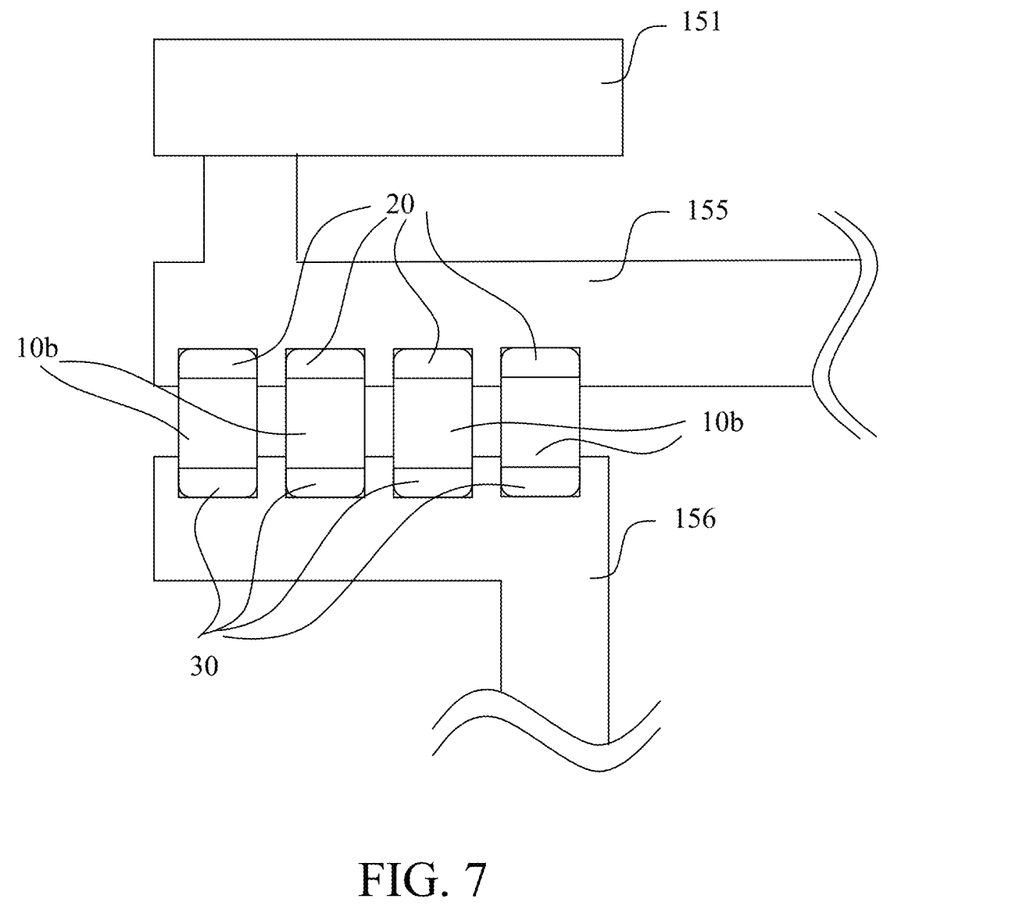
FIG. 7 illustrates a connection of a second all-solid-state battery.

The second all-solid-state battery 10b is disposed near the control substrate connector 151 as illustrated in FIG. 7. The power supply pattern 155 is connected to the positive electrode terminal 20 of the second all-solid-state battery 10b and the power supply circuit 66 so that four second all-solid-state batteries 10b are connected in parallel. The GND pattern 156 is connected to the negative electrode terminal 30. The second all-solid-state battery 10b is charged by the power supplied from the power supply circuit 66, and can supply the power from the second all-solid-state battery 10b to the wireless module 90 via the control substrate connector 151 and the wireless FPC 170.

This embodiment connects the second all-solid-state batteries 10b in parallel, and thereby handle a current amount for operating the wireless module 90. Therefore, even when the camera 100 is powered off, a wireless communication can be performed for a long time, which is convenient for the user. While this embodiment connects four second all-solid-state batteries 10b in parallel, the series and parallel may be connected in combination, or the number of the second all-solid-state batteries 10b may be different. While this embodiment connects the positive electrode terminal 20 to the power supply pattern 155 and the negative electrode terminal 30 to the GND pattern 156, the positive electrode terminal 20 may be connected to the GND pattern 156 and the negative electrode terminal 30 may be connected to the power supply pattern 155.

Figure 8:
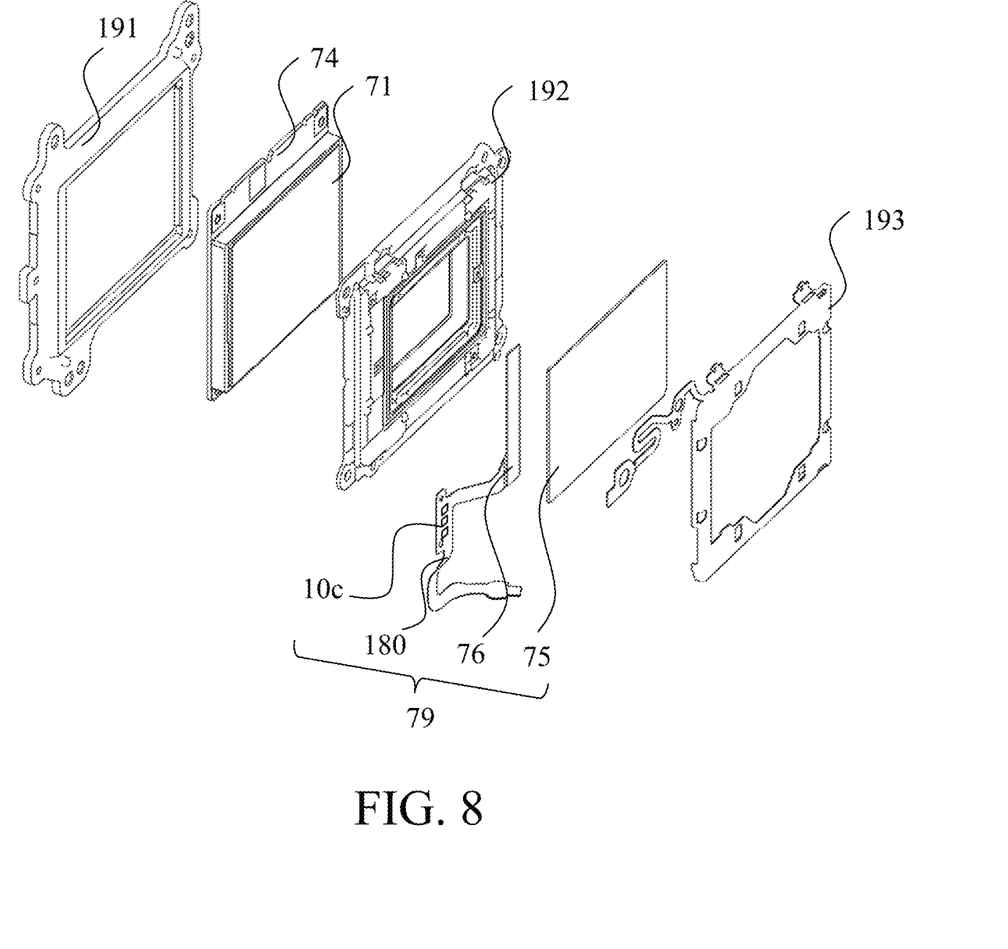
FIG. 8 illustrates a configuration around a dust removing unit.

Referring now to FIG. 8, a description will be given of the configuration around the dust removing unit 79. FIG. 8 illustrates a configuration around the dust removing unit 79.

The image sensor 71 and the circuit of the imaging system are mounted on an imaging substrate 74. An imaging substrate support sheet metal 191 supports the imaging substrate 74 with screws or adhesive agent (not shown). An optical element holder 192 is made of resin, holds the optical low-pass filter 75, and is fixed onto the imaging substrate support sheet metal 191 by screws (not shown). An optical element energizer 193 is disposed in front of the optical low-pass filter 75, is engaged with an engaging portion provided in the optical element holder 192, and holds the optical low-pass filter 75 while sandwiching the optical low-pass filter 75 with the optical element holder 192. The optical low-pass filter 75 and the piezoelectric element 76 are compressively attached to each other. The piezoelectric element FPC 180 is compressively attached to the piezoelectric element 76 and electrically connected to the piezoelectric element 76. The third all-solid-state battery 10c is mounted on the piezoelectric element FPC 180.

Figure 9:
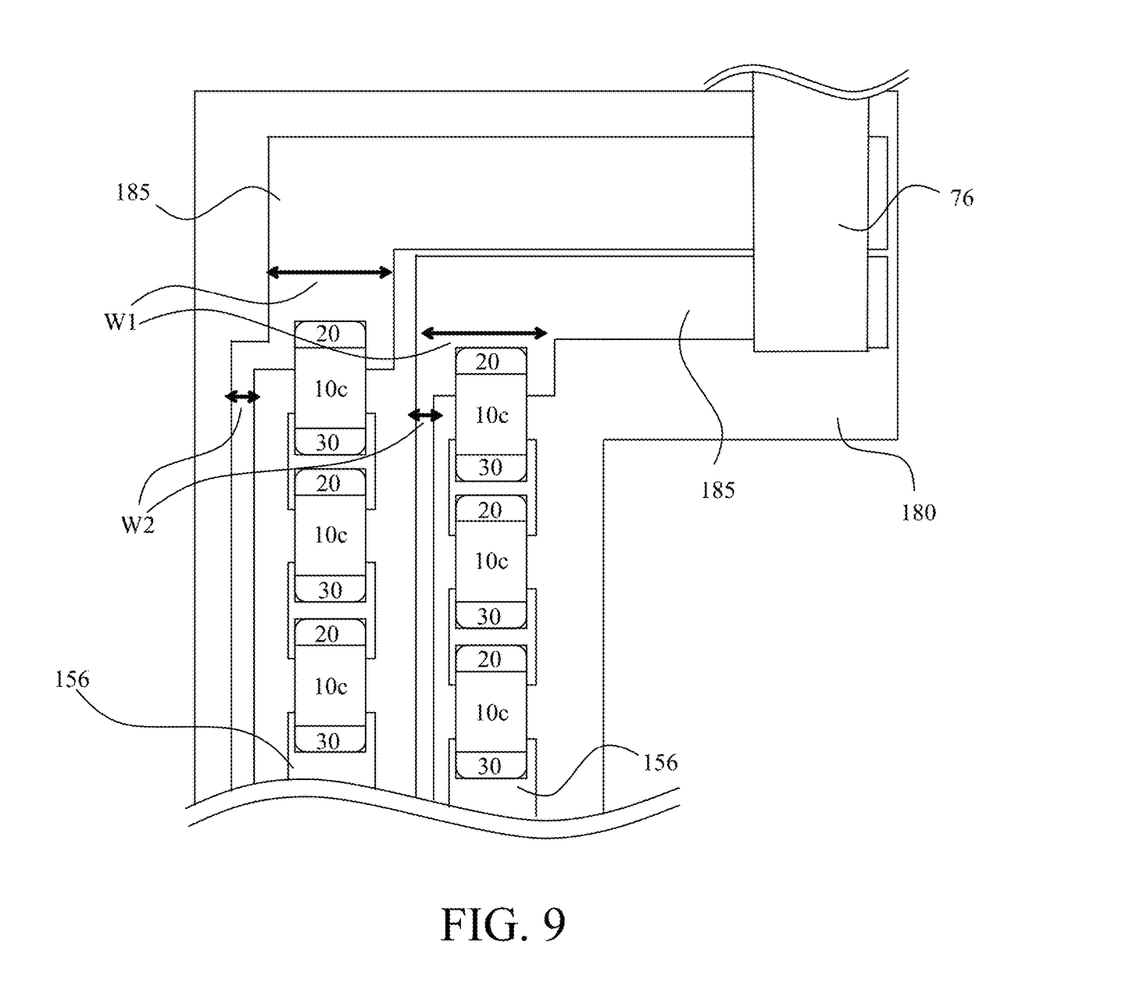
FIG. 9 illustrates a connection of a third all-solid-state battery.

FIG. 9 illustrates the connections of the third all-solid-state batteries 10c. A dust removing pattern 185 is wired to the piezoelectric element FPC 180 with a conductive material such as copper foil. The dust removing pattern 185 is connected to the positive electrode terminal 20 of the third all-solid-state battery 10c so that three third all-solid-state batteries 10c are connected in series. In addition, the dust removing pattern 185 is connected to the power supply circuit 66 and the piezoelectric element 76. The GND pattern 156 is connected to the negative electrode terminal 30. The third all-solid-state battery 10c is charged by the power supplied from the power supply circuit 66, and can apply the voltage from the third all-solid-state battery 10c to the piezoelectric element 76.

In this embodiment, a wiring width W2 from the third all-solid-state battery 10c to the power supply circuit 66 is set narrower than a wiring width W1 from the piezoelectric element 76 to the third all-solid-state battery 10c. Since a large current is required to remove the dust, it is necessary to wire a thick pattern from the power supply circuit 66. However, in this embodiment, the piezoelectric element 76 is driven by the charged power after the third all-solid-state battery 10c is charged by interposing the third all-solid-state battery 10c. Since there is no problem even with the thin pattern for charging the third all-solid-state battery 10c, the wiring width W2 from the third all-solid-state battery 10c to the power supply circuit 66 is set thin, and the wiring width W1 from the third all-solid-state battery 10c to the piezoelectric element 76 is set to the conventional pattern width. Thereby, the dust removing pattern 185 up to the third all-solid-state battery 10c can be made thinner, and the dust removing unit 79 can be made smaller.

A high voltage is required to remove the dust. However, the dust removal function is not a frequently used function, and thus the battery capacity is not required. Therefore, when the third all-solid-state battery 10c is used as the power supply for the dust removing function, a desired voltage can be obtained by the series connection. In this embodiment, three third all-solid-state batteries 10c are connected in series, but the series and parallel may be connected in combination, or the number of the third all-solid-state batteries 10c may be different. This embodiment connects the positive electrode terminal 20 to the dust removing pattern 185 and the negative electrode terminal 30 to the GND pattern 156, but the positive electrode terminal 20 may be connected to the GND pattern 156 and the negative electrode terminal 30 may be connected to the dust removing pattern 185.

Figure 10:
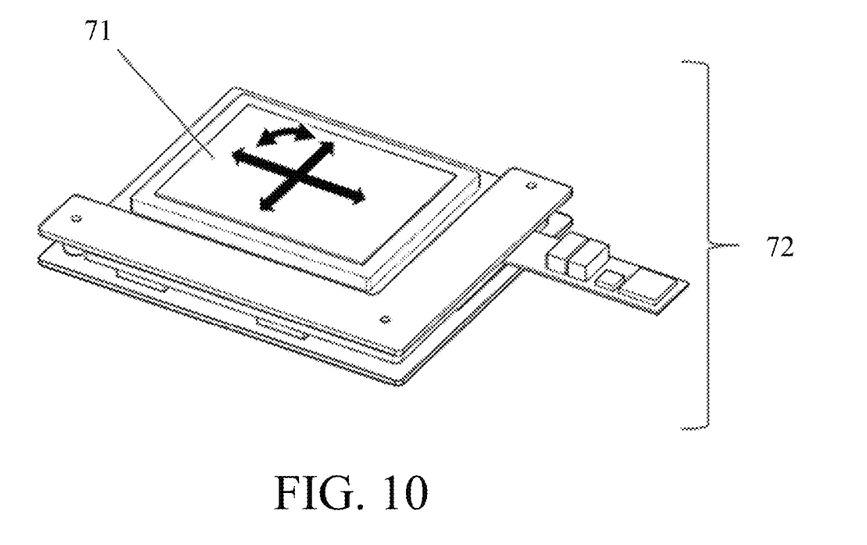
FIG. 10 is a perspective view of an imaging unit driving mechanism.
Figure 11:
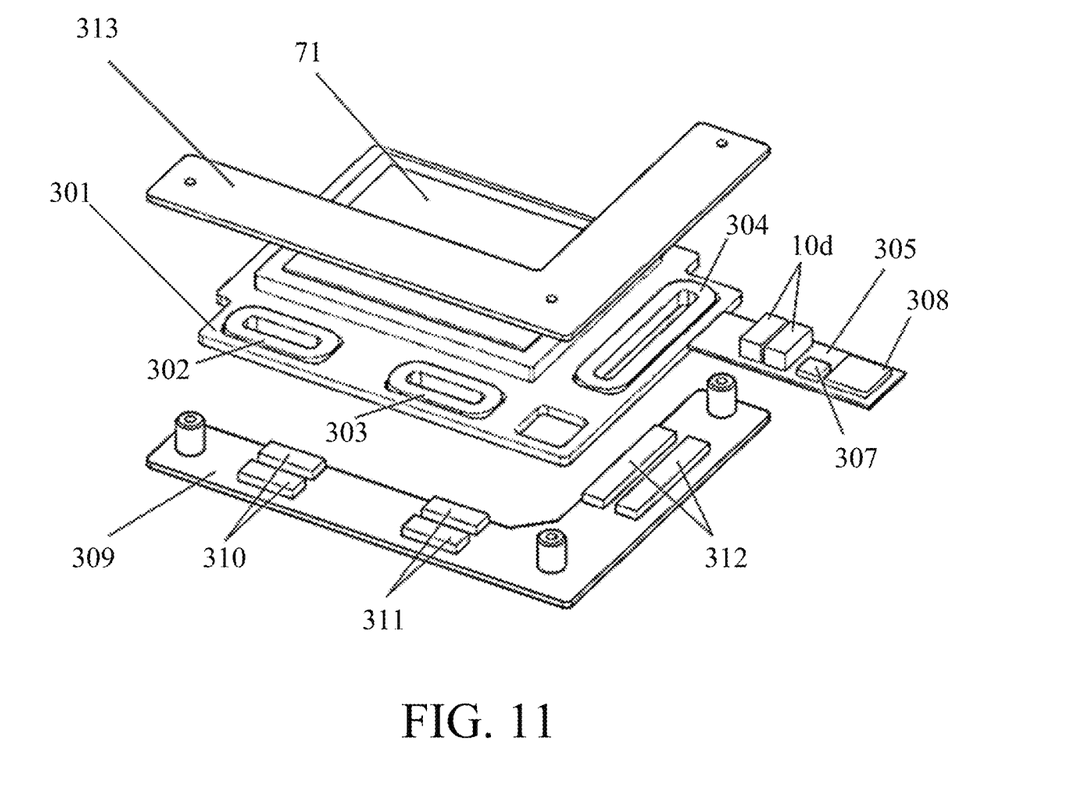
FIG. 11 is an exploded perspective view of the imaging unit driving mechanism.

Next, the imaging unit driving mechanism 72 will be described. FIG. 10 is a perspective view of the imaging unit driving mechanism 72. FIG. 11 is an exploded perspective view of the imaging unit driving mechanism 72.

The image sensor 71 is disposed on the image sensor driving mechanism 72. The image sensor 71, a first driving coil 302, a second driving coil 303, and a third driving coil 304 are arranged on an image sensor pedestal 301. The first end of the image sensor driving mechanism FPC 305 is electrically connected to the image sensor pedestal 301, and mounted with the fourth all-solid-state battery 10d, an NFC receiver 307, and the image sensor driving mechanism control IC 308.

It is assumed that two or more fourth all-solid-state batteries 10d are mounted, and connected in series or in parallel in order to obtain desired power. The second end of the imaging unit driving mechanism FPC 305 is electrically connected to the control substrate 150. A first driving magnet 310, a second driving magnet 311 and a third driving magnet 312 are arranged on a lower yoke 309. The first driving magnet 310, the second driving magnet 311 and the third driving magnet 312 are opposite to the first driving coil 302, the second driving coil 303, and the third driving coil 304, respectively. The image sensor pedestal 301 is floatingly supported above the lower yoke 309. By energizing the coil facing the magnet disposed in the lower yoke 309, an electromagnetic force is generated and the image sensor 71 can be moved. In order to effectively utilize the magnetic flux, the magnet and the coil are arranged and sandwiched between an upper yoke 313 and the lower yoke 309. When the camera 100 is powered on, the MPU 40 controls the energization of the coil to freely move the image sensor 71 in an arrow direction in FIG. 10, and realizes an image stabilization function and a dust shaking-off function. When the camera 100 is powered on, the fourth all-solid-state battery 10d is in a charged state by the power supplied from the battery 65.

When the camera 100 is powered off, the power charged in the fourth all-solid-state battery 10d is supplied to the NFC receiver 307 and the imaging unit driving mechanism control IC 308.

Figure 12:
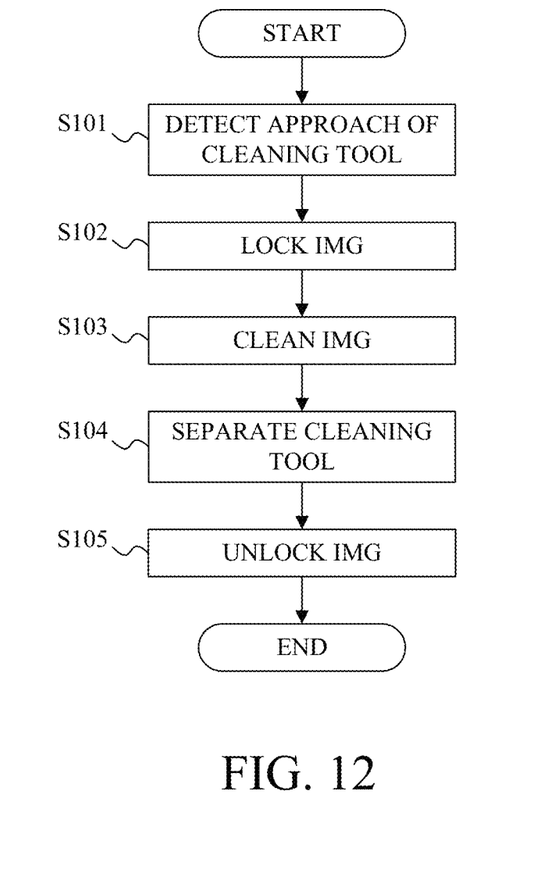
FIG. 12 is a flowchart showing a cleaning operation sequence of an image sensor.
Figure 13:
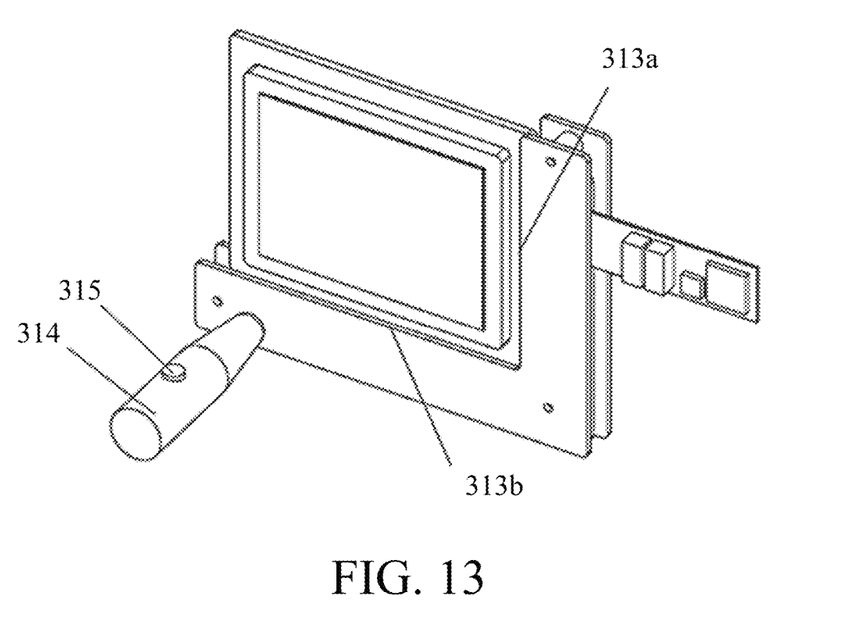
FIG. 13 is a perspective view of the imaging unit driving mechanism when the cleaning tool is close to the image sensor.
Figure 14:
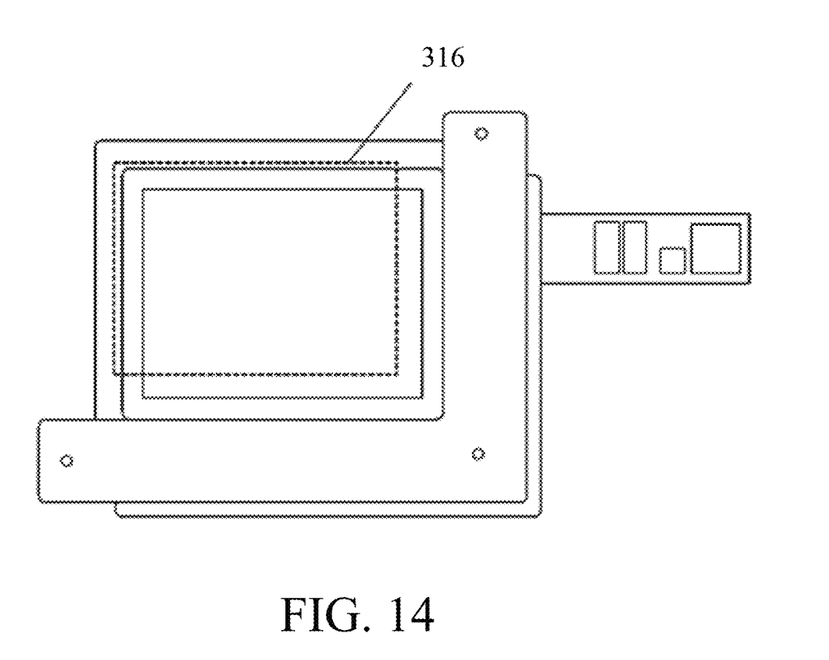
FIG. 14 is a front view of the imaging unit driving mechanism in the state of FIG. 13.

FIG. 12 is a flowchart showing a cleaning operation sequence of the image sensor 71 using the power of the fourth all-solid-state battery 10d. FIG. 13 is a perspective view of the imaging unit driving mechanism 72 when the cleaning tool 314 is close to the image sensor 71. FIG. 14 is a front view of the imaging unit driving mechanism 72 in the state of FIG. 13.

Before the flow of FIG. 12 starts, the camera 100 is powered on, and the fourth all-solid-state battery 10d is supplied with the power from the battery 65 and charged. This flow starts when the camera 100 is powered off, that is, when the battery 65 is removed from the camera 100, or when the power switch 112 is turned off, and the cleaning of the image sensor 71 is started. At this time, the NFC receiver 307 and the imaging unit driving mechanism control IC 308 are supplied with the power from the fourth all-solid-state battery 10d and maintained in the ON state.

In the step S101, the NFC receiver 307 receives a radio wave transmitted from the NFC transmitter 315 mounted on the cleaning tool 314, and the imaging unit driving mechanism control IC 308 detects an approach of the cleaning tool 314. At this time, the imaging unit driving mechanism control IC 308 makes a control so as to supply the power from the fourth all-solid-state battery 10d to the first to third driving coils 302 to 304.

In the step S102, the image sensor driving mechanism 72 is controlled so that the image sensor pedestal 301 contacts and is locked (or fixed) on the upper yokes 313a and 313b. When the camera 100 is powered on, for example, during normal imaging, the image sensor 71 moves to a center holding position 316 having a center overlapping the center of the optical axis of the camera 100, and the image sensor driving mechanism 72 is controlled so as to hold the image sensor 71 at the center holding position 316.

In the step S103, the surface of the image sensor 71 is cleaned by the cleaning tool 314. At this time, since the image sensor pedestal 301 is fixed, it does not move with the movement of the cleaning tool 314. Thereby, cleaning with less unwiped residue and less uneven wiping can be made than a case where the unfixed image sensor 71 is cleaned.

In the step S104, the cleaning tool 314 separates from the image sensor 71. At this time, the reception of the radio wave transmitted from the NFC transmitter 315 by the NFC receiver 307 ends.

In the step S105, the imaging unit driving mechanism control IC 308 makes a control so as to end the power supply from the fourth all-solid-state battery 10d to the first to third driving coils 302 to 304, and to unlock the image sensor 71.

As described above, the configuration of this embodiment connects the all-solid-state batteries to each unit in the camera 100, and drives each unit using each of the battery 65 and the all-solid-state battery. Thereby, various functions can be executed or completed, regardless of the state of the battery 65 or the user operation, with a simple configuration, and the usability of the camera 100 can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-048277, filed on Mar. 18, 2020 which is hereby incorporated by reference herein in its entirety.

What is claimed is:

1. An electronic apparatus comprising:
   a first power supply attachable to and detachable from a body of the electronic apparatus;
   a driver configured to perform a predetermined operation;
   an image sensor configured to photoelectrically convert an object image;
   an optical element disposed in front of the image sensor;
   a piezoelectric element connected to the optical element and driven when a voltage is applied to the piezoelectric element;
   a flexible printed circuit board configured to apply the voltage to the piezoelectric element;
   a substrate connected to the driver; and
   a second power supply mounted on the substrate, and electrically connected to and charged by the first power supply,
   wherein the first power supply is connected to a power supply circuit and the second power supply can be charged by the first power supply through the power supply circuit,
   wherein the driver includes the image sensor, the optical element, the piezoelectric element, and the flexible printed circuit board and is drivable by a power supplied from the first power supply and drivable by a power supplied from the second power supply,
   wherein in a state where the first power supply is removed from the electronic apparatus or power supplied to the power supply circuit by the first power supply is interrupted, the driver is drivable by the power supplied from the second power supply,
   wherein the second power supply is an all-solid-state battery containing a solid electrolyte, and
   wherein the substrate is the flexible printed circuit board.

2. The electronic apparatus according to claim 1, wherein the second power supply includes a plurality of mount type batteries connected in parallel.

3. The electronic apparatus according to claim 1, wherein the second power supply includes a plurality of mount type batteries connected in series.

4. The electronic apparatus according to claim 1, wherein the driver is a first controller configured to control the electronic apparatus, and mounted on the substrate.

5. The electronic apparatus according to claim 1, wherein the driver is a wireless module configured to wirelessly communicate with an external device.

6. The electronic apparatus according to claim 1, wherein a wiring width from the first power supply to the second power supply is narrower than a wiring width from the second power supply to the piezoelectric element.

7. The electronic apparatus according to claim 1, wherein the driver includes an image sensor configured to photoelectrically convert an object image, a driving coil, and a driving magnet, the driver being configured to drive the image sensor in a plane orthogonal to an optical axis.

8. The electronic apparatus according to claim 7, wherein the driver includes:
   a pedestal including the image sensor, a first driving coil, a second driving coil, and a third driving coil;
   an upper yoke;
   a lower yoke including a first driving magnet opposite to the first driving coil, a second driving magnet opposite to the second driving coil, and a third driving magnet opposite to the third driving coil; and
   a flexible printed circuit board including a second controller configured to control energizations of the first driving coil, the second driving coil, and the third driving coil, and connected to the pedestal,
   wherein the substrate is the flexible printed circuit board,
   wherein the first driving magnet, the second driving magnet, the third driving magnet, the first driving coil, the second driving coil, and the third driving coil are sandwiched between the upper yoke and the lower yoke,
   wherein the pedestal is floatingly supported above the lower yoke, and
   wherein in cleaning the image sensor when the electronic apparatus is powered off, the second controller controls the energizations of the first driving coil, the second driving coil, and the third driving coil from the first power supply in order to lock the image sensor.

9. The electronic apparatus according to claim 8, wherein in cleaning the image sensor when the electronic apparatus is powered off, the second controller controls the energizations of the first driving coil, the second driving coil, and the third driving coil from the first power supply so that the pedestal contacts the upper yoke in order to lock the image sensor.

10. The electronic apparatus according to claim 1, wherein the second power supply is charged by the power supplied from the first power supply when the electronic apparatus is powered on.

* * * * *